United States Patent
Chapuis (10) Patent No.: US 7,141,956 B2
(45) Date of Patent: Nov. 28, 2006

(54) DIGITAL OUTPUT VOLTAGE REGULATION CIRCUIT HAVING FIRST CONTROL LOOP FOR HIGH SPEED AND SECOND CONTROL LOOP FOR HIGH ACCURACY

(75) Inventor: Alain Chapuis, Morgan Hill, CA (US)

(73) Assignee: Power-One, Inc., Camarillo, CA (US)

( * ) Notice: Subject to any disclaimer, the term of this patent is extended or adjusted under 35 U.S.C. 154(b) by 0 days.

(21) Appl. No.: 11/084,766

(22) Filed: Mar. 18, 2005

(65) Prior Publication Data
US 2006/0208716 A1   Sep. 21, 2006

(51) Int. Cl.
*G05F 1/40* (2006.01)
*H03M 1/48* (2006.01)

(52) U.S. Cl. ...................... 323/283; 341/114
(58) Field of Classification Search ............... 323/283, 323/282, 288; 341/110, 114, 155
See application file for complete search history.

(56) References Cited

U.S. PATENT DOCUMENTS

| | | | |
|---|---|---|---|
| 429,581 A | 6/1890 | Tan | |
| 3,660,672 A | 5/1972 | Berger et al. | |
| 4,194,147 A | 3/1980 | Payne et al. | |
| 4,204,249 A | 5/1980 | Dye et al. | |
| 4,335,445 A | 6/1982 | Nercessian | |
| 4,451,773 A | 5/1984 | Papathomas et al. | |
| 4,538,073 A | 8/1985 | Freige et al. | |
| 4,538,101 A | 8/1985 | Shimpo et al. | |
| 4,616,142 A | 10/1986 | Upadhyay et al. | |
| 4,622,627 A | 11/1986 | Rodriguez et al. | |
| 4,654,769 A | 3/1987 | Middlebrook | |
| 4,677,566 A | 6/1987 | Whittaker et al. | |
| 5,053,920 A | 10/1991 | Staffiere et al. | |
| 5,073,848 A | 12/1991 | Steigerwald et al. | |
| 5,079,498 A | 1/1992 | Cleasby et al. | |
| 5,117,430 A | 5/1992 | Berglund | |
| 5,229,699 A | 7/1993 | Chu et al. | |
| 5,272,614 A * | 12/1993 | Brunk et al. ............. | 363/21.05 |
| 5,349,523 A | 9/1994 | Inou et al. | |
| 5,377,090 A | 12/1994 | Steigerwald | |
| 5,481,140 A | 1/1996 | Maruyama et al. | |
| 5,532,577 A | 7/1996 | Doluca | |
| 5,627,460 A | 5/1997 | Bazinet et al. | |

(Continued)

FOREIGN PATENT DOCUMENTS

EP           315366           5/1989

(Continued)

OTHER PUBLICATIONS

33702 Microprocessor Power Supply (3.0A) Analog Products MC33702 Fact Sheet; Motorola/ Digital dna/ Power Management Switching; pp. 1-4.

(Continued)

*Primary Examiner*—Karl Easthom
*Assistant Examiner*—Harry Behm
(74) *Attorney, Agent, or Firm*—O'Melveny & Myers LLP (57) ABSTRACT

A switched mode voltage regulator has a digital control system that includes dual digital control loops. The voltage regulator comprises at least one power switch adapted to convey power between respective input and output terminals of the voltage regulator and a digital controller adapted to control operation of the power switches responsive to an output of the voltage regulator. The digital controller further comprises dual digital control loops in which a first control loop provides high speed with lower regulation accuracy and a second control loop has high accuracy with lower speed. Thus, the digital control system provides the advantages of both high speed and high regulation accuracy.

21 Claims, 6 Drawing Sheets

U.S. PATENT DOCUMENTS

| | | |
|---|---|---|
| 5,646,509 A | 7/1997 | Berglund et al. |
| 5,675,480 A | 10/1997 | Stanford |
| 5,727,208 A | 3/1998 | Brown |
| 5,752,047 A | 5/1998 | Darty et al. |
| 5,815,018 A | 9/1998 | Soborski |
| 5,847,950 A | 12/1998 | Bhagwat |
| 5,872,984 A | 2/1999 | Berglund et al. |
| 5,874,912 A * | 2/1999 | Hasegawa .................. 341/161 |
| 5,883,797 A | 3/1999 | Amaro et al. |
| 5,892,933 A | 4/1999 | Voltz |
| 5,905,370 A | 5/1999 | Bryson |
| 5,917,719 A | 6/1999 | Hoffman et al. |
| 5,929,618 A | 7/1999 | Boylan et al. |
| 5,935,252 A | 8/1999 | Berglund et al. |
| 5,943,227 A | 8/1999 | Bryson et al. |
| 5,946,495 A | 8/1999 | Scholhamer et al. |
| 5,990,669 A | 11/1999 | Brown |
| 6,057,607 A | 5/2000 | Rader, III et al. |
| 6,079,026 A | 6/2000 | Berglund et al. |
| 6,115,441 A | 9/2000 | Douglass et al. |
| 6,157,182 A | 12/2000 | Tanaka et al. |
| 6,163,143 A | 12/2000 | Shimamori |
| 6,163,178 A | 12/2000 | Stark et al. |
| 6,181,029 B1 | 1/2001 | Berglund et al. |
| 6,191,566 B1 | 2/2001 | Petricek et al. |
| 6,194,883 B1 | 2/2001 | Shimamori |
| 6,199,130 B1 | 3/2001 | Berglund et al. |
| 6,208,127 B1 | 3/2001 | Doluca |
| 6,211,579 B1 | 4/2001 | Blair |
| 6,262,900 B1 | 7/2001 | Suntio |
| 6,351,108 B1 * | 2/2002 | Burstein et al. ............ 323/283 |
| 6,385,024 B1 | 5/2002 | Olson |
| 6,392,577 B1 | 5/2002 | Swanson et al. |
| 6,396,169 B1 | 5/2002 | Voegli et al. |
| 6,396,250 B1 | 5/2002 | Bridge |
| 6,421,259 B1 | 7/2002 | Brooks et al. |
| 6,429,630 B1 | 8/2002 | Pohlman et al. |
| 6,448,745 B1 * | 9/2002 | Killat ......................... 323/222 |
| 6,469,484 B1 | 10/2002 | L'Hermite et al. |
| 6,556,158 B1 * | 4/2003 | Steensgaard-Madsen .... 341/131 |
| 6,563,294 B1 | 5/2003 | Duffy et al. |
| 6,583,608 B1 | 6/2003 | Zafarana et al. |
| 6,621,259 B1 | 9/2003 | Jones et al. |
| 6,683,494 B1 | 1/2004 | Stanley |
| 6,731,023 B1 | 5/2004 | Rothleitner et al. |
| 6,771,052 B1 | 8/2004 | Ostojic |
| 6,788,033 B1 | 9/2004 | Vinciarelli |
| 6,788,035 B1 | 9/2004 | Bassett et al. |
| 6,791,302 B1 | 9/2004 | Tang et al. |
| 6,791,368 B1 | 9/2004 | Tzeng et al. |
| 6,795,009 B1 | 9/2004 | Duffy et al. |
| 6,819,537 B1 | 11/2004 | Pohlman et al. |
| 6,829,547 B1 | 12/2004 | Law et al. |
| 6,833,691 B1 | 12/2004 | Chapuis |
| 6,911,808 B1 * | 6/2005 | Shimamori ................. 323/283 |
| 6,915,440 B1 | 7/2005 | Berglund et al. |
| 6,933,709 B1 | 8/2005 | Chapuis |
| 6,947,273 B1 | 9/2005 | Bassett et al. |
| 6,963,190 B1 | 11/2005 | Asanuma et al. |
| 6,965,502 B1 | 11/2005 | Duffy et al. |
| 6,975,494 B1 | 12/2005 | Tang et al. |
| 7,007,176 B1 | 2/2006 | Goodfellow et al. |
| 7,023,672 B1 | 4/2006 | Goodfellow et al. |
| 2001/0033152 A1 | 10/2001 | Pohlman et al. |
| 2002/0073347 A1 | 6/2002 | Zafarana et al. |
| 2002/0105227 A1 | 8/2002 | Nerone et al. |
| 2003/0122429 A1 | 7/2003 | Zhang et al. |
| 2003/0142513 A1 | 7/2003 | Vinciarelli |
| 2003/0201761 A1 | 10/2003 | Harris |
| 2004/0027101 A1 | 2/2004 | Vinciarelli |
| 2004/0090219 A1 | 5/2004 | Chapuis |
| 2004/0093533 A1 | 5/2004 | Chapuis et al. |
| 2004/0123164 A1 | 6/2004 | Chapuis et al. |
| 2004/0123167 A1 | 6/2004 | Chapuis |
| 2004/0135560 A1 | 7/2004 | Kernahan et al. |
| 2004/0155640 A1 | 8/2004 | Sutardja et al. |
| 2004/0178780 A1 | 9/2004 | Chapuis |
| 2004/0189271 A1 * | 9/2004 | Hansson et al. ............ 323/283 |
| 2004/0246754 A1 | 12/2004 | Chapuis |
| 2005/0093594 A1 | 5/2005 | Kim et al. |
| 2006/0022656 A1 * | 2/2006 | Leung et al. ............... 323/283 |

FOREIGN PATENT DOCUMENTS

| | | |
|---|---|---|
| EP | 0660487 | 6/1995 |
| EP | 0875994 | 11/1998 |
| EP | 0997825 | 5/2000 |
| RU | SU1814177 | 5/1993 |
| WO | WO93/19415 | 9/1993 |
| WO | WO02/31943 | 4/2002 |
| WO | WO02/31951 | 4/2002 |
| WO | WO02/50690 | 6/2002 |

OTHER PUBLICATIONS

"Electronic Products" Power Supply Special The Engineer's Magazine of Product Technology, A Hearst Business Publication, vol. 37, No. 10, Mar. 1995, 4 pages.

"KEKB Power Supply Interface Controller Module" by A. Akiyama, T. Nakamura, M. Yoshida, T. Kubo, N. Yamamoto and T. Katoh. KEK, High Energy Accelerator Research Organization, 1-1 Ohio, Tsukuba 305, Japan International Conference on Accelerator and Large Experimental Physics and Control Systems, 1997, Beijing, China, 4 pages.

"Magnet Power Supply Control System in KEKB Accelerators" by T.T. Nakamura, A. Akiyama, T. Katoh, Ta. Kubo, N. Yamamoto, M. Yoshida. KEK, Tsukuba, Japan International Conference on Accelerator and Large Experimental Physics Control Systems, 1999, Trieste, Italy, pp. 406-408.

"Motorola Switch Mode Power Supply With Mulitple Linear Regulators And High Speed CAN Transceiver" Motorola, Inc. 2002; digital dna; Analog Marketing; Rev. 2.5, Nov. 2002; 33394; Multi-Output Power Supply Semiconductor Technical Data.

"Power Management Solutions For Networking Applications"; Presented by Luc Darmon Smart Networks Developer Forum Jun. 4-6, 2003 Euro-Disney Paris, France; Motorola digital dna; www.motorola.com/sndf; pp. 1-26.

Preliminary Information 1.5 A Switch-Mode Supply With Linear Regulator 33701; Power Supply Integrated Circuit; Motorola Semiconductor Technical Data; Analog Marketing MC33701/D Rev. 1.0, May 2003; Motorola digital dna; pp. 1-24.

"Quantization Resolution and Limit Cycling in Digitally Controlled PWM Converters" by Angel V. Peterchev and A.V. Sanders Electrical Engineering and Computer Science; UC Berkley; Power Electronics Specialists Conference, 2001.PESC, vol. 2, Jun. 17-21, 2001, pp. 465-471; XP002274573.

"System Management Bus Specification" Smart Bettery System Specifications, Revision 1.1, Dec. 11, 1998 Copyright 1996, 1997, 1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG, All rights reserved, 39 pages.

"The I2C-Bus Specification" Version 2.1, Jan. 2000 Document Order No. 9398 393 40011, pp.1-46.

"Distributed Intelligence and Modular Architecture for Next Generation DC Power System" by Louis Duguay and Pierre Got Astec Advanced Power Systems, Quebec, CANADA; 6 pgs.

"Digitally-Controlled SMPS Extends Power System Capabilities" by Ron Vinsant, John DiFiore, and Richard Clarke PCIM, Jun. 1994, pp. 30-37.

"Operating and Service Manual", SBC488A Magna-Power Electronics, Inc., Dec. 19, 2002, 58 pgs.

"Operating and Service Manual", SQ Series, DC Power Supplies Magna-Power Electronics, Inc., Dec. 16, 2002, 48 pgs.

"Uniform Language for Accessing Power Plants—Human-Machine Language", ANSI T1.317-1993 American National Standards Institue, Dec. 14, 1993, 55 pages.

"An Intellignet, Fault Tolerant, High Power, Distributed Power System for Massively Parallel Processing Computers" by J. Burns, J. Riel and T. DiBene IEEE, May 1994, 0-7803-1456-5/94, pp. 795-800.

"BE510/BE510S Modules"—Bipolar DC Source from 100mV to 20V and from 100nA to 4A Innovative Test Sytems; BE510 Version II, Issue 9, Nov. 12, 2000, 3 pgs.

"BE52x Modules"—Multi-range bipolar DC sources from 30V to 500V, 90W Innovative Test Systems; BE52x Version A, Issue 9, Aug. 3, 2001, 3 pages.

"PCX-150A 150 Amp Pulsed Current Source Operation Manual", Version 3.0 Directed Energy, Inc., 2001, 31 pages.

"New Applications Demand Programmable Power Supplies/Sources" by Paul O'Shea http://www.evaluationengineering.com/archive/articles/0997powr.htm, Nelson Publishing, Inc., 1997, 8 pages.

"Market Trends Toward Enhanced Control of Electronic Power Systems" by F.M. Miles, R.K. Danak, T.G. Wilson and G.G. Suranyi IEEE, 1993, 0-7803-0982-0/93, pp. 92-98.

"R Options, S. Option DC Power Supplies", IEEE 488.2/RS-232 Programming Manual Power Ten, Jun. 25, 2002, 56 pages.

"A Digitally Controlled Zero-Voltage-Switched Fullbridge Converter" by Karl-Heinz Rinne, Klaus Theml, Joseph Duigan and Oliver McCarthy Power Conversion, Jun. 1994 Proceedings, pp. 317-324.

"Volume 1: Syntax and Style" Standard Commands for Programmable Instruments (SCPI) Consortium, May 1997, Version 1997.0, 68 pages.

"Integrate Internet Solutions Into Your Energy Management Network" by Johan Sarkinen and Ola Lundin Jun. 1998, 7 pages.

"Automating the Design of a Generic Modular Power System for the Global Market" by George Pedersen, Steve Briggs, and Paul Massey Advance Power Raynham Road, Bishops Stortford, Herts.; CM23 5PF UK.

"An Operation and Maintenance Process Model for Energy Mangement" by Ola Lundin Ericsson Components AB, Energy Systems Division, S-164 81 KISTA—Stockholm, Sweden; 7 pages.

"Intellignet Platform Management Interface Specification v1.5" Intel, Hewlett-Packard, NEC, Dell, Feb. 20, 2002, 459 pages.

"Volume 2: Command Reference" SCPI Consortium, May 1997, Version 1997.0, 506 pages.

"Volume 4: Instrument Classes" SCPI Consortium, May 1997, Version 1997.0, 58 pages.

"Volume 1: Syntax and Style" SCPI Consortium, May 1999, Version 1999.0, 67 pages.

"Volume 3: Data Interchange Format" SCPI Consortium, May 1997, Version 1997.0, 73 pages.

"Volume 3: Data Interchange Format" SCPI Consortium, May 1999, Version 1999.0, 72 pages.

"Volume 4: Instrument Classes" SCPI Consortium, May 1999, Version 1999.0, 115 pages.

"Service Guide for Agilent 6610xA Power Modules" Agilent Technologies Agilent Part No. 5959-3364, Dec. 2002, 101 pages.

"DHP Series DC Power Supplies", IEEE 488.2/RS-232 Options Programming Manual Sorensen, Division of Elgar Electronics Corporation, Jul. 29, 2002, 32 pages.

"Distributed Power Hot Swap Controller" SMH4804 Summit Microelectronics, Inc., 2050 2.3, Mar. 19, 2001, 32 pages.

"Programmer Manual", PS2520G & PS2521G Programmable Power Supplies Tektronix, 070-9197-00, 1995, 70 pages.

"User Manual", PS2520, PS2520G, PS2521 & PS2521G Programmable Power Supplies Tektronix, 070-9196-00, 1995, 56 pages.

"A Power LAN for Telecommunication Power Supply Equipment" by Nicholas Vun C.H., Lau C.T. and Lee B.S. IEEE TENCON '93 Beijing, pp. 24-27.

"VXI Bus Programmable DC Power Supplies" Advanced Power Designs, Inc., Irvine, CA; 4 pages.

"Operating Manual for Internal RS-232 Interface for XT 60 Watt and HPD 300 Watt Series Programmable DC Power Supplies" Xantrex Technology, Inc., 59 pages.

"Auto Sequence Programming Examples for GPIB-M" Xantrex Technology, Inc., Nov. 27, 2002, 1.0a, 4 pages.

"SCPI Programming Examples for GPIB-M" Xantrex Technology, Inc., Nov. 26, 2002, 1.0, 3 pages.

"Implementing a Nationwide Energy Management System" by Stig Sjöberg, Tommy Hedberg, Lars Selberg and Rober Wikstöm.

"IEEE Standard Codes, Formats, Protocols, and Common Commands for User with IEEE Std 488.1-1987, IEEE Standard Digital Interface for Programmable Instrumentation", IEEE Std 488.2-1992 IEEE, Jun. 18, 1992, ISBN 1-55937-238-9, 254 pages.

"Agilent E3640A—E3649A Programmable dc Power Supplies" Data Sheet Agilent Technologies, 4 pages.

"Agilent E364xA Single Output DC Power Supplies" User's Guide Agilent Technologies, Part No. E3640-90001, Jan. 2000, 207 pages.

"Optimizing Power Product Usage to Speed Design Validation Testing" Application Note 1434 Agilent Technologies, Nov. 22, 2002, 16 pages.

"Volume 2: Command Reference" SCPI Consortium, May 1999, Version 1999.0, 565 pages.

"Why have Monitoring?" by P. Shawyer, P. Hobbs and A. McLeod Texcel Technology PLC, United Kingdom.

"IMPI Intelligent Platform Management Bus Communications Protocol Specification v1.0" Intel, Hewlett-Packard, NEC, Dell, Nov. 15, 1999, 39 pages.

"Operating and Service Manual", MQ Series DC Power Supplies Magna-Power Electronics, Inc., Dec. 19, 2002, 48 pages.

"User's Guide" Series 661xxA MPS Power Moduels & Model 66001A MPS Keyboard Agilent Technologies, Agilent Part No. 5959-3386, Apr. 2000, 53 pages.

"Programming Guide" Series 661xxA MPS Power Modules Agilent Technologies, Agilent Part No. 5959-3362, Sep. 1997, 114 pages.

"Accelerator-Control-System Interface for Intelligent Power Supplies" by S. Cohen Los Alamos National Laboratory, pp. 183-186.

"Testing Intelligent Power Supplies for the Los Alamos National Laboratory Accelerator Complex" by J.C. Sturrock, S. Cohen, B.L. Weintraub, D.J. Hayden and S.F. Archuletta Los Alamos National Laboratory, pp. 217-219.

"Intelligent Power Supply Controller" by R.S. Rumrill and D.J. Reinagel IEEE, Aug. 1991, 0-7803-0135-8/91, PAC 1991, pp. 1537-1539.

"Management Power Supply as a Network Object" by S. Cohen and R. Stuewe IEEE, Aug. 1991, 0-7803-0135-8/91, PAC 1991, pp. 929-931.

"Non-Impact Printer Power and Motor Control System on a Chip" by James Masson and Steven Barrow IEEE, Apr. 1995, IEEE Catalogue No. 95TH8025, 0-7803-2423-4/95, pp. 98-103.

"Power Distribution Systems for Future Homes" by Po-Wa Lee, Yim-Shu Lee and Bo-Tao Lin IEEE, Aug. 1999, 0-7803-5769-88/99, pp. 1140-1146.

"Installation Guide" MPS Mainframe Model 66000A Agilent Technologies, Agilent Part No. 66000-90001, Apr. 2000, 26 pages.

"Power System Controller in an Intelligent Telecom Rectifier Plant" by Ueli Roth IEEE, Aug. 1992, 0-7803-0779-8/92, pp. 476-483.

"The Continuing Evolution of Intelligence for Telecommunications Power Plants" by Jimmy Godby IEEE, Apr. 1996, 0-7803-3507-4/96, pp. 70-75.

"Digitally Controlled Power Systems: How Much Intelligence is Needed and Where it Should be" by Tom Lock RELTEC Corporation, 5 pages.

"Controlling and Alarming DC Power Plants via the INTERNET" by Anthony P. Cosentino, Michael C. Sullivan, Richard V. Baxter, Jr. and Jon Loeck Power Conversion Products, LLC and Pensar Corpoartion, 6 pages.

"Defendant's Artesyn Technologies, Inc.'s Preliminary Invalidity Contentions"—(*Power-One, Inc.* vs. *Artesyn Technologies, Inc. et al.*) Civil Action No. 2-05-CV-463 (LED), United States District Court for the Eastern District of Texas; Apr. 26, 2006.

"Synchronization of Multiple Voltage Regulator Outputs," by M.W. Mueller et al. IBM Technical Disclosure Bulletin, Jun. 1999; (2 pages).

"Power System Controller in an Intelligent Telecom Rectifier Plant," by U. Roth. INTELLEC 1992, pp. 476-483.

Integrity-One; Installation, Operation and Maintenance Manual Power-One, Inc., 1999-2003 Version 1.2 (P025374-P025559).

Data Sheet, Integrity-One Power System—Rack System Power-One, Inc. (P025580-P025583).

Data Sheet, "PCS Controller" Power-One, Inc. (P025584-P025585).

Data Sheet, "PMP 25 Rectifier Module" Power-One, Inc. (P025602-P025603).

* cited by examiner

DIGITAL OUTPUT VOLTAGE REGULATION CIRCUIT HAVING FIRST CONTROL LOOP FOR HIGH SPEED AND SECOND CONTROL LOOP FOR HIGH ACCURACY

BACKGROUND OF THE INVENTION

1. Field of the Invention

The present invention relates to voltage regulator circuits, and more particularly to digital control over a switched mode voltage regulator using dual feedback loops for improved regulation.

2. Description of Related Art

Switched mode voltage regulators are known in the art to convert an available direct current (DC) level voltage to another DC level voltage. A switched mode voltage regulator provides a regulated DC output voltage to a load by selectively storing energy in an output inductor coupled to the load by switching the flow of current into the output inductor. A buck converter is one particular type of switched mode voltage regulator that includes two power switches that are typically provided by MOSFET transistors. A filter capacitor coupled in parallel with the load reduces ripple of the output current. A pulse width modulation (PWM) control circuit is used to control the gating of the power switches in an alternating manner to control the flow of current in the output inductor. The PWM control circuit uses feedback signals reflecting the output voltage and/or current level to adjust the duty cycle applied to the power switches in response to changing load conditions.

Conventional PWM control circuits are constructed using analog circuit components, such as operational amplifiers and comparators. But, it is desirable to use digital circuitry instead of the analog circuit components since digital circuitry takes up less physical space and draws less power. A conventional digital PWM control circuit includes a subtractor that produces an error signal representing the difference between a signal to be controlled (e.g., output voltage ($V_o$)) and a reference voltage. An analog-to-digital converter (ADC) converts the error signal into a digital signal. The digital error signal is provided to a loop compensation filter having a transfer function H(z) that provides stability for the voltage regulator feedback loop. A digital pulse width modulator (DPWM) then produces a proportional pulse width modulated signal that is used to control the power switches of the voltage regulator.

In order to keep the complexity of the PWM control circuit low, it is desirable to hold the number of bits of the digital signal to a small number. At the same time, however, the number of bits of the digital signal needs to be sufficiently high to provide enough resolution to secure precise control of the output value. If the output voltage needs to be programmable through a large range, it is even more difficult to maintain a small DC error on the subtractor and therefore set point accuracy errors will increase. While the circuit can be made accurate over a wide range by providing adjustable gain and offset, this comes with additional cost and complexity. Moreover, the ADC needs to be very fast to respond to changing load conditions and enable fast transient response of the feedback loop. Current microprocessors exhibit supply current slew rates of up to 20 A/µs, and future microprocessors are expected to reach slew rates greater than 350 A/µs, thereby demanding extremely fast response by the voltage regulator. Very often, fast response time and DC precision are contradictory requirements. The bit size of the digital signal also affects the complexity of the digital circuitry that implements the transfer function H(z) and hence the associated cost.

Thus, it would be advantageous to provide a system and method for digitally controlling a switched mode voltage regulator that overcomes these and other drawbacks of the prior art. More specifically, it would be advantageous to provide a double-loop output voltage control circuit for controlling a switched mode voltage regulator using digital circuitry having better repeatability and accuracy.

SUMMARY OF THE INVENTION

The present invention provides a switched mode voltage regulator having a digital control system. Generally, the voltage regulator comprises at least one power switch adapted to convey power between respective input and output terminals of the voltage regulator and a digital controller adapted to control operation of the power switches responsive to an output of the voltage regulator. The digital controller further comprises dual digital control loops in which a first control loop provides high speed with lower regulation accuracy and a second control loop has high accuracy with lower speed. Thus, the invention provides the advantages of both high speed and high accuracy.

More particularly, the first digital control loop includes a first analog-to-digital converter providing a first digital error signal representing a difference between a first output measurement of the voltage regulator and a reference value, a first digital filter providing a digital control output based on the first digital error signal, and a digital pulse width modulator providing a control signal to the power switches. The control signal has a pulse width corresponding to the digital control output. The second digital control loop includes a second analog-to-digital converter providing a second output measurement of the voltage regulator. The second digital control loop provides a second digital error signal representing a difference between the second output measurement and the reference value. The second analog-to-digital converter has greater resolution than the first analog-to-digital converter. The second digital error signal is applied to the first digital control loop to thereby improve accuracy of the first output measurement.

In an embodiment of the invention, a serial interface is operatively coupled to the first and second digital control loops and is adapted to receive reference data defining the reference value. The serial interface is further adapted to send monitor data corresponding to the second output measurement. The serial interface is further adapted to receive coefficient data and provide the coefficient data to the first digital filter, the coefficient data defining filter characteristics of the first digital filter. A digital-to-analog converter is operatively coupled to the serial interface, and is adapted to convert the reference data to the reference value.

A more complete understanding of the system and method for digitally controlling a switched mode voltage regulator will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a digital double-loop output voltage control circuit for controlling a switched mode voltage regulator. In the detailed description that follows, like element numerals are used to describe like elements illustrated in one or more figures.

Figure 1:
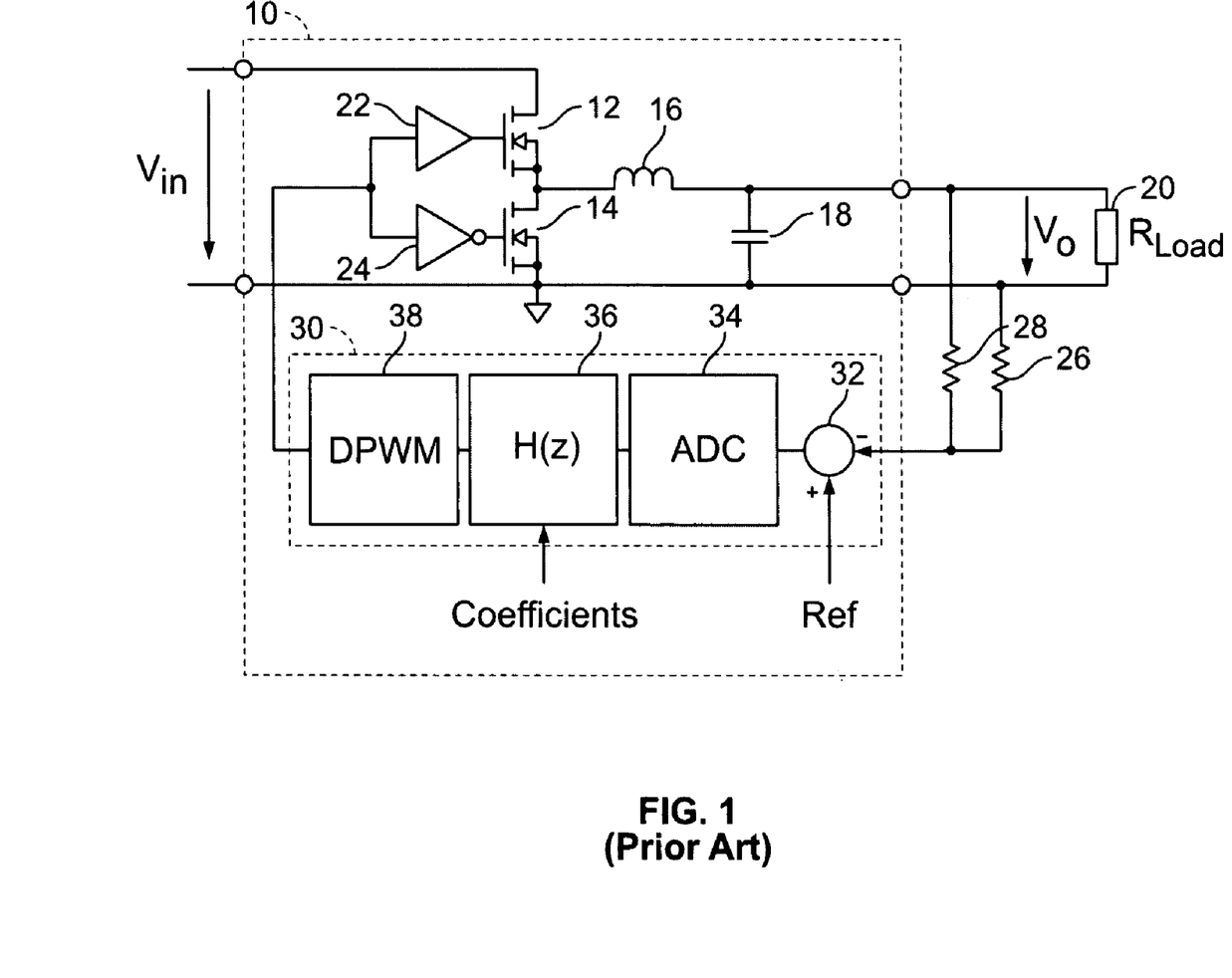
FIG. 1 depicts a switched mode voltage regulator having a conventional digital control circuit.

FIG. 1 depicts a switched mode voltage regulator 10 having a conventional digital control circuit. The voltage regulator 10 comprises a buck converter topology to convert an input DC voltage $V_{in}$ to an output DC voltage $V_o$ applied to a resistive load 20 ($R_{load}$). The voltage regulator 10 includes a pair of power switches 12, 14 provided by MOSFET devices. The drain terminal of the high side power switch 12 is coupled to the input voltage $V_{in}$, the source terminal of the low side power switch 14 is connected to ground, and the source terminal of power switch 12 and the drain terminal of power switch 14 are coupled together to define a phase node. An output inductor 16 is coupled in series between the phase node and the terminal providing the output voltage $V_o$, and a capacitor 18 is coupled in parallel with the resistive load $R_{load}$. Respective drivers 22, 24 alternatingly drive the gate terminals of the power switches 12, 14. In turn, digital control circuit 30 (described below) controls operation of the drivers 22, 24. The opening and closing of the power switches 12, 14 provides an intermediate voltage having a generally rectangular waveform at the phase node, and the filter formed by the output inductor 16 and capacitor 18 converts the rectangular waveform into a substantially DC output voltage $V_o$.

The digital control circuit 30 receives a feedback signal from the output portion of the voltage regulator 10. As shown in FIG. 1, the feedback signal corresponds to the output voltage $V_o$, though it should be appreciated that the feedback signal could alternatively (or additionally) correspond to the output current drawn by the resistive load $R_{load}$ or a combination thereof. The feedback path may further include a voltage divider provided by resistors 26, 28 to reduce the detected output voltage $V_o$ to a representative voltage level. The digital control circuit 30 provides a pulse width modulated waveform having a duty cycle controlled to regulate the output voltage $V_o$ (or output current) at a desired level. Even though the exemplary voltage regulator 10 is illustrated as having a buck converter topology, it should be understood that the use of feedback loop control of the voltage regulator 10 using the digital control circuit 30 is equally applicable to other known voltage regulator topologies, such as boost and buck-boost converters in isolated or non-isolated configurations.

More particularly, the digital control circuit 30 includes subtractor 32, analog-to-digital converter (ADC) 34, digital filter 36, and digital pulse width modulator (DPWM) 38. The subtractor 32 receives as inputs the feedback signal (i.e., output voltage $V_o$) and a voltage reference (Ref) and provides an analog voltage error signal (Ref–$V_o$). The ADC 34 produces a digital representation of the voltage error signal. The digital filter 36 has a transfer function H(z) that transforms the voltage error signal to a digital output provided to the DPWM 38, which converts the digital output into a waveform having a proportional pulse width. As discussed above, the pulse-modulated waveform produced by the DPWM 38 is coupled to the gate terminals of the power switches 12, 14 through respective drivers 22, 24. The digital filter 36 may further comprise an infinite impulse response (IIR) filter having filter coefficients that may be selectively modified through a suitable input to thereby alter the performance characteristics of the digital filter. As discussed above, a drawback of the conventional digital control circuit 30 is that the subtractor 32 has limited static accuracy.

Figure 2:
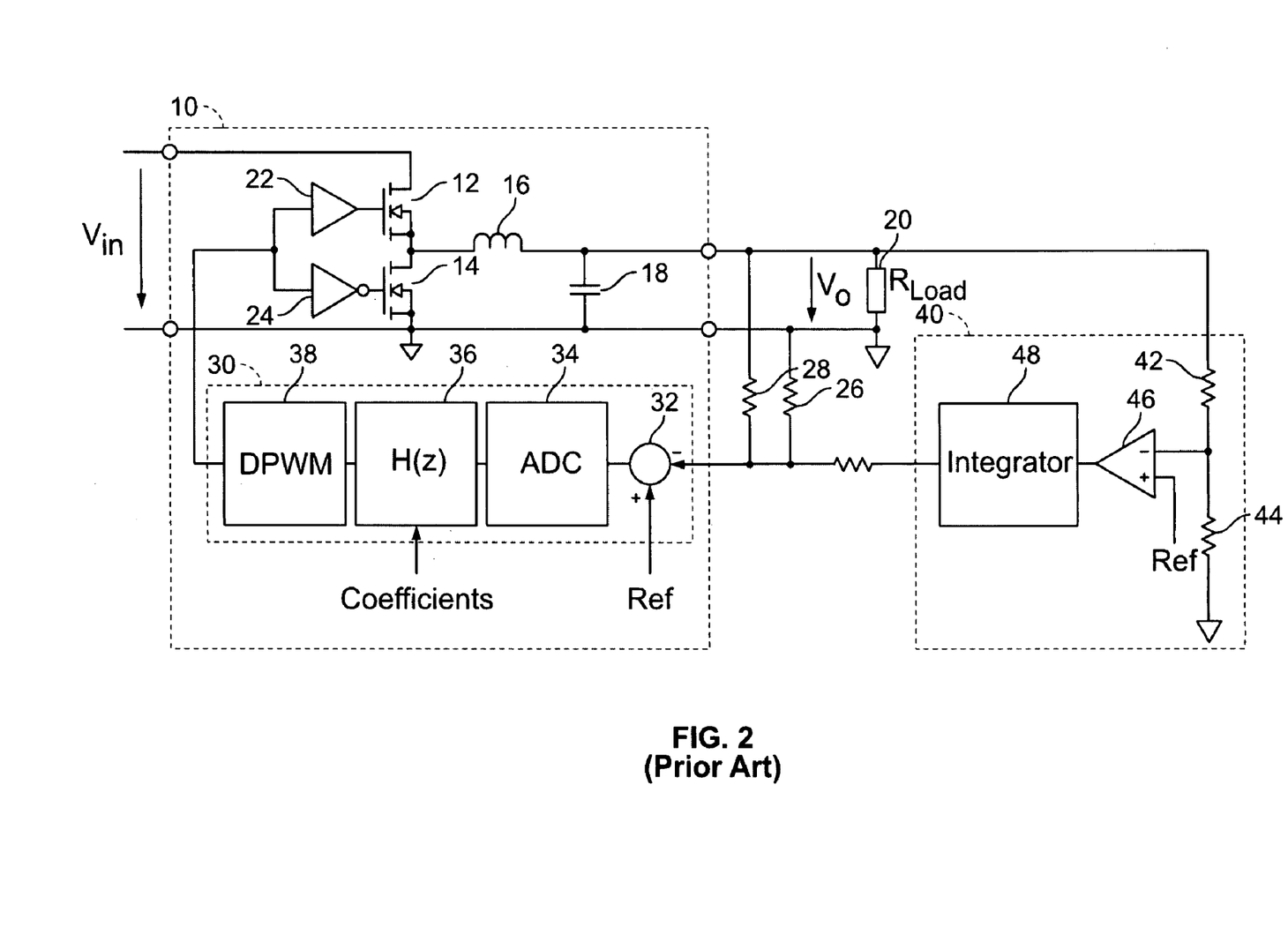
FIG. 2 depicts a switched mode voltage regulator having a digital control circuit with a second analog control loop.

To improve the output voltage set point accuracy of the digital control circuit 30, a second analog control loop 40 may be added, as shown in FIG. 2. The second control loop includes an amplifier 46 and an integrator 48. As with the first control loop, the second control loop 40 receives a feedback signal from the output portion of the voltage regulator 10 that corresponds to the output voltage $V_o$. The feedback path may further include a voltage divider provided by resistors 42, 44 to reduce the detected output voltage $V_o$ to a representative voltage level. The feedback signal is provided to the inverting input terminal of the amplifier 46, and the non-inverting input terminal of the amplifier is coupled to a reference voltage. The amplifier 46 is selected to have lower bandwidth than the subtractor 32, thereby allowing greater accuracy with lower speed. The output of the amplifier 46 is provided to the integrator 48, which in turn provides an adjusting voltage to the subtractor 32 of the first loop through a suitable resistor. The integrator 48 assures that the error signal of the second control loop remains at zero during steady state operation. The first control loop provides fast transient response, while the second control loop provides high DC accuracy under steady state conditions.

Figure 3:
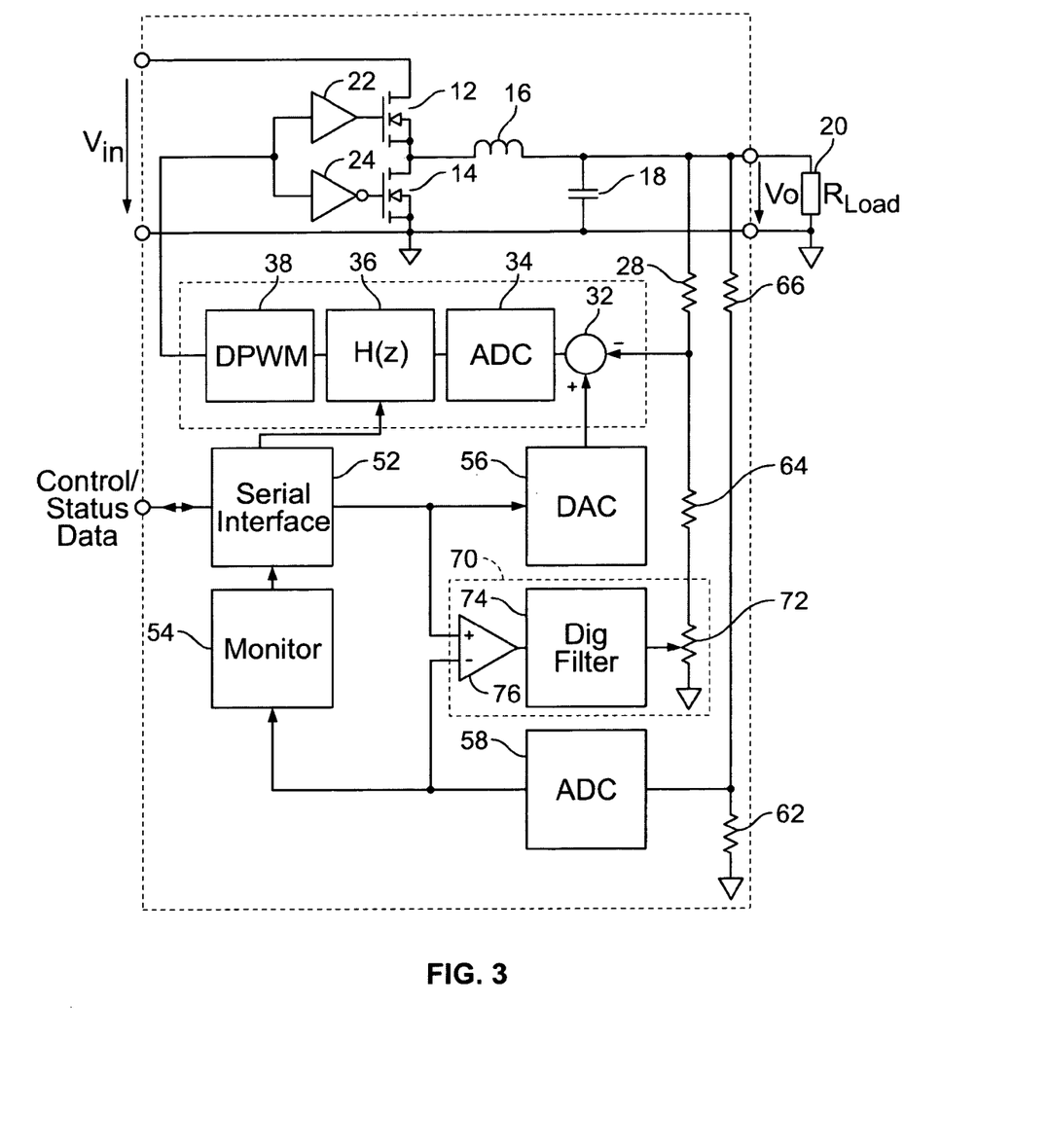
FIG. 3 depicts a switched mode voltage regulator having a digital double-loop control circuit in accordance with a first embodiment of the invention.

Referring now to FIG. 3, a switched mode voltage regulator having a digital double-loop control circuit is illustrated in accordance with a first embodiment of the invention. The digital control circuit includes a serial interface 52 that permits bidirectional data communication with a host system to receive data to control operation of the digital control circuit, and hence the voltage regulator, and to send status information back to the host system. A digital-to-analog converter 56 is coupled to the serial interface 52. A digital reference value provided from the host system via the serial interface 52 is converted by the digital-to-analog converter 56 to a reference voltage, that is in turn provided to the subtractor 32 for comparison to the representation of the output voltage $V_O$. This way, the host system can define the reference voltage, and thereby control the output voltage $V_O$. The serial interface 52 also communicates filter coefficient values to the digital filter 36 from the host system to thereby control the characteristics of the digital filter 36. In these respects, the digital control circuit includes a first control loop that is substantially the same as the circuit described above with respect to FIG. 1.

A second digital control loop is provided by analog-to-digital converter 58 and a digital filter circuit 70. The analog-to-digital converter 58 receives a feedback signal corresponding to the output voltage $V_o$, reduced to a representative voltage level by voltage divider provided by resistors 62, 66. The analog-to-digital converter 58 is coupled to the serial interface 52 through a monitoring circuit 54. This way, the analog-to-digital converter 58 provides an accurate digital measurement of the output voltage, and this information may be communicated back to the host system through the monitoring circuit and the serial interface 52. In a preferred embodiment of the invention, the digital-to-analog converter 56 has a much lower resolution than the monitoring analog-to-digital converter 58. The resolution of the digital-to-analog converter 56 is selected to correspond to the specific supply voltage requirements of different loads $R_{load}$. The analog-to-digital converter 34 has a small conversion range, but needs to be fast. Since there is always some residual ripple voltage present at the output of the regulator and the analog-to-digital converter 34 needs to have a fast response time, the ripple voltage cannot be filtered out since this would slow down the conversion process. The ripple therefore yields to an additional error signal in the first loop. The monitoring analog-to-digital converter 58 can run with a rather low sampling rate, but it should be accurate. To increase accuracy, the monitoring analog-to-digital converter 58 will include an anti-aliasing filter on its input which also will reduce the ripple voltage seen on the output of the regulator. This analog-to-digital converter 58 will therefore measure the true average value of the output and therefore has inherently better accuracy than the analog-to-digital converter 34.

The digital filter circuit 70 further includes a digital comparator 76, a digital filter 74, and a variable resistor 72. The digital comparator 76 receives at a first input the digital reference value provided by the host system and at a second input the digital measurement of the output voltage $V_O$, and produces a digital error value. The digital error value passes through the digital filter 74 and controls the setting of the variable resistor 72. The variable resistor 72 is part of the voltage divider defined by resistors 28 and 64. Accordingly, the representation of the output voltage $V_O$ provided to the subtractor 32 may be adjusted by controlling the setting of the variable resistor 72.

Figure 4:
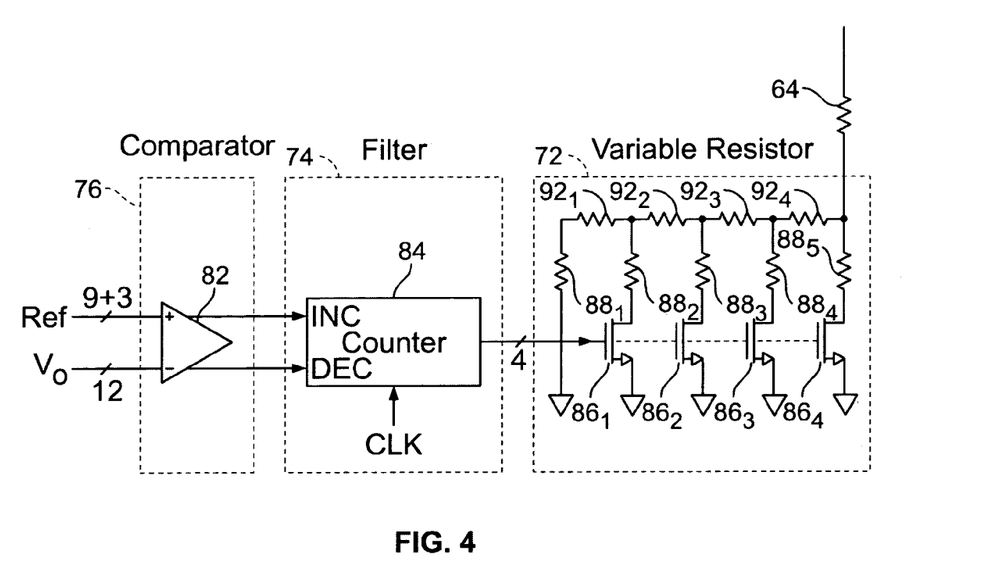
FIG. 4 depicts an exemplary digital filter for use in the digital double-loop control circuit of FIG. 3.

FIG. 4 illustrates an embodiment of the digital filter circuit 70 in greater detail. As discussed above, the digital reference value will usually have less resolution than the monitoring output of the analog-to-digital converter 58. In the embodiment of the FIG. 4, the reference signal has nine-bit resolution and the monitoring output has twelve-bit resolution. A digital comparator 82 is shown as having two twelve-bit inputs. The reference signal is multiplied by eight (i.e., by adding three trailing 0 bits) to scale it to the same width as the monitoring output. The digital comparator 82 compares the values and generates two outputs (i.e., A>B, and A<B). The two signals control an up/down counter 84 that acts as an integrator. Thus, the counter is incremented when the reference signal exceeds the monitoring output (A>B), and the counter is decremented when the monitoring output exceeds the reference signal (A<B). The counter 84 is selected such that it does not over-roll (i.e., the count does not go below zero and stops when it has reached its maximum). As shown in FIG. 4, the counter 84 has four-bit resolution with a range from zero to fifteen.

A variable resistor is formed from field effect transistors $86_1$–$86_4$, each having a source terminal coupled to ground and respective drain terminals coupled to resistors $88_2$–$88_5$. Resistors $88_1$ and $92_1$–$92_4$ are coupled together in series and between successive ones of the transistors $86_1$–$86_4$. The gate terminals of the transistors $86_1$–$86_4$ are coupled to respective bits of the four-bit output of the counter 84. By activating individual ones of the field effect transistors $86_1$–$86_4$, and thereby coupling associated ones of the resistors in parallel, the effective resistance of the variable resistor is changed. The values of the resistors may be selected such that the output voltage changes (e.g., from −2% to +2%) when the counter changes from zero to fifteen.

The counter 84 is clocked by a signal having a frequency that is substantially lower than the PWM frequency of the first digital control loop. In an embodiment of the invention, the counter 84 is clocked by a signal having a frequency ranging from 100 to 1000 times lower than the PWM frequency. Accordingly, the second digital control loop is substantially slower than the first digital control loop, yet provides higher accuracy in view of the larger resolution of the monitoring analog-to-digital converter 58.

Since the digital comparator 82 and the counter 84 are simple digital circuits, it is relatively easy to implement these circuits within a single digital control circuit containing both digital control loops. A drawback of this embodiment is that the digital filter 74 still acts on an analog circuit, i.e., the variable resistor 72. Thus, the digital correction value is converted back into an analog signal before acting upon the first digital control loop. It would therefore be further advantageous to have a control circuit that can be implemented using entirely digital circuitry.

Figure 5:
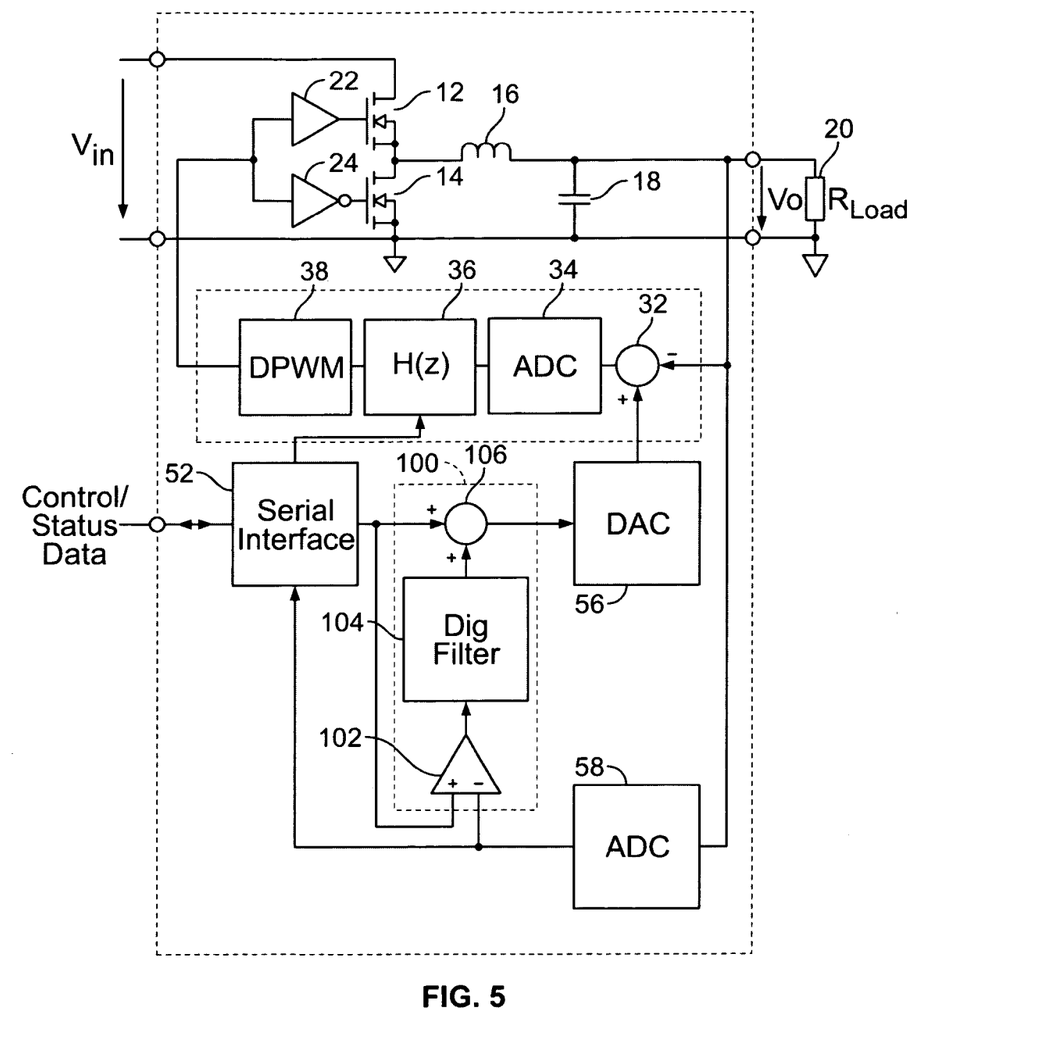
FIG. 5 depicts a switched mode voltage regulator having a digital double-loop control circuit in accordance with a second embodiment of the invention.

Referring now to FIG. 5, a switched mode voltage regulator having a digital double-loop control circuit is illustrated in accordance with a second embodiment of the invention. This embodiment differs from the preceding embodiment by including a digital filter circuit 100 having a digital comparator 102, a digital filter 104, and adder 106. As in the preceding embodiment, the digital comparator 102 receives at a first input the digital reference value provided by the host system and at a second input the digital measurement of the output voltage $V_O$, and produces a digital error value. The digital error value passes through the digital filter 104 and provides a digital value to the adder 106. The adder combines the digital reference value with the filtered digital value to produce an adjusted digital reference value. The adjusted digital reference value is provided to digital-to-analog converter 56, which converts the digital reference value to a reference voltage that is in turn provided to the subtractor 32 for comparison to the representation of the output voltage $V_O$. Thus, the digital filter 104 modifies the reference value directly instead of using the resistor divider of the first control loop.

Since the reference digital-to-analog converter 56 has lower resolution than the monitoring analog-to-digital converter 58, the adjusted digital reference value may fall between discrete points of the digital-to-analog converter, which is exacerbated by the fact that the second digital control loop runs at a much lower frequency. Accordingly, in an embodiment of the invention, the digital filter circuit 100 is adapted to virtually increase the resolution of the reference digital-to-analog converter 56. Moreover, the digital filter circuit 100 takes advantage of the fact that the first digital control loop has a low pass filter characteristic. In particular, if the digital reference value can be switched up and down by one count fast enough, then the first digital control loop will average the switching reference value and present an average reference value at the output of the reference digital-to-analog converter 56.

Figure 6:
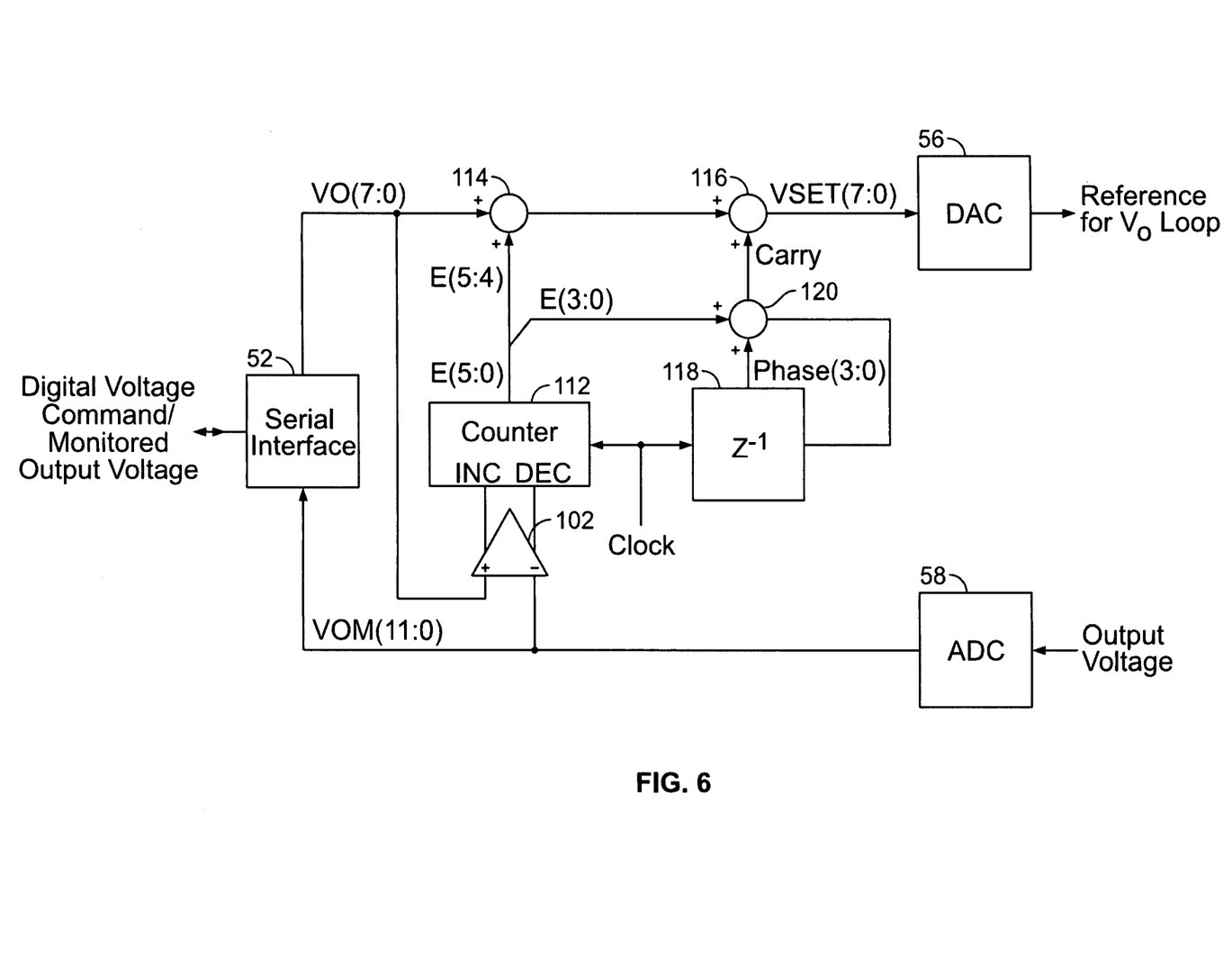
FIG. 6 depicts an exemplary digital filter for use in the digital double-loop control circuit of FIG. 5.

More specifically, FIG. 6 shows the digital filter circuit 100 of FIG. 5 in greater detail. The digital filter circuit includes a phase accumulator that provides dithering of the digital reference value. The digital filter circuit is further illustrated as including counter 112, adders 114, 116, 120, and phase converter 118. As in the embodiment of FIG. 4, digital comparator 102 compares the monitored and referenced values and generates two outputs (i.e., A>B, and A<B). The two signals control an up/down counter 112 that acts as an integrator. Thus, the counter is incremented when the reference signal exceeds the monitoring output (A>B), and the counter is decremented when the monitoring output exceeds the reference signal (A<B). The counter 112 generates a six-bit digital error value that is divided such that the most significant two bits are provided to the adder 114 and the least significant four bits are provided to the adder 120. These least significant bits are considered to be the fractional part of the correction signal and are dithered over time by the phase register 118, which stores a continuous sum of the four-bit error values. The adder 120, which combined with the phase register 118 provides a phase accumulator in which the lower four bits of the error value are added to the phase value, is in turn fed back to the phase register. Whenever the adder 120 overflows, it produces a carry bit that is provided to adder 116. By adding the carry from the digital error value produced by adder 114, the adder 116 results in dithering of the fractional part of the digital error value E(5:0).

By way of example, the average value of the dithered reference can be set in increments ranging from 0, $\frac{1}{16}$, $\frac{2}{16}$ ... $\frac{15}{16}$, ... $1\frac{4}{16}$, $3\frac{15}{16}$, etc. Thus, the resolution of the digital-to-analog converter 56 resolution can be programmed in fractional amounts to permit controlling of the output voltage of the first loop in a more accurate way without requiring a digital-to-analog converter having high resolution.

Having thus described a preferred embodiment of a system and method for digitally controlling a switched mode voltage regulator, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A voltage regulator comprising:
at least one power switch adapted to convey power between respective input and output terminals of said voltage regulator; and
a digital controller adapted to control operation of said at least one power switch responsive to an output of said voltage regulator, said digital controller comprising:
a first digital control loop including a first analog-to-digital converter providing a first digital error signal representing a difference between a first output measurement of said voltage regulator and a reference value, a first digital filter providing a digital control output based on said first digital error signal, and a digital pulse width modulator providing a control signal to said at least one power switch, said control signal having a pulse width corresponding to said digital control output; and
a second digital control loop including a second analog-to-digital converter providing a second output measurement of said voltage regulator, said second digital control loop providing a second digital error signal representing a difference between said second output measurement and said reference value, said second analog-to-digital converter having greater resolution than said first analog-to-digital converter, said second digital error signal being applied to said first digital control loop to improve accuracy of said first output measurement and thereby improve regulation of said voltage regulator.

2. The voltage regulator of claim 1, further comprising a serial interface operatively coupled to said first and second digital control loops and adapted to receive reference data defining said reference value.

3. The voltage regulator of claim 2, wherein said serial interface is further adapted to send monitor data corresponding to said second output measurement.

4. The voltage regulator of claim 2, wherein said serial interface is further adapted to receive coefficient data and provide said coefficient data to said first digital filter, said coefficient data defining filter characteristics of said first digital filter.

5. The voltage regulator of claim 2, further comprising a digital-to-analog converter operatively coupled to said serial interface, said digital-to-analog converter converting said reference data to said reference value.

6. The voltage regulator of claim 1, wherein said first digital control loop further comprises a subtractor providing an analog error signal representing said difference between said first output measurement and said reference value, said analog error signal being provided to said first analog-to-digital converter.

7. The voltage regulator of claim 1, A voltage regulator comprising:
at least one power switch adapted to convey power between respective input and output terminals of said voltage regulator; and
a digital controller adapted to control operation of said at least one power switch responsive to an output of said voltage regulator, said digital controller comprising:
a first digital control loop including a first analog-to-digital converter providing a first digital error signal representing a difference between a first output measurement of said voltage regulator and a reference value, a first digital filter providing a digital control output based on said first digital error signal, and a digital pulse width modulator providing a control signal to said at least one power switch, said control signal having a pulse width corresponding to said digital control output; and
a second digital control loop including a second analog-to-digital converter providing a second output measurement of said voltage regulator, said second digital control loop providing a second digital error signal representing a difference between said second output measurement and said reference value, said second analog-to-digital converter having greater resolution than said first analog-to-digital converter, said second digital error signal being applied to said first digital control loop to improve accuracy of said first output measurement and thereby improve regulation of said voltage regulator;
wherein said second digital control loop further comprises a digital comparator receiving said second output measurement and said reference value and providing said second digital error signal.

8. The voltage regulator of claim 7, wherein said second digital control loop further comprises a counter operatively coupled to said digital comparator, said counter counting in a first direction if said second output measurement is less than said reference value and counting in an opposite direction if said second output measurement is more than said reference value.

9. The voltage regulator of claim 8, wherein said second digital control loop further comprises a variable resistor operatively coupled to said output terminals and responsive to said counter to adjust said first output measurement.

10. A voltage regulator comprising:
at least one power switch adapted to convey power between respective input and output terminals of said voltage regulator; and
a digital controller adapted to control operation of said at least one power switch responsive to an output of said voltage regulator, said digital controller comprising:
a first digital control loop including a first analog-to-digital converter providing a first digital error signal representing a difference between a first output measurement of said voltage regulator and a reference value, a first digital filter providing a digital control output based on said first digital error signal, and a digital pulse width modulator providing a control signal to said at least one power switch, said control signal having a pulse width corresponding to said digital control output; and
a second digital control loop including a second analog-to-digital converter providing a second output measurement of said voltage regulator, said second digital control loop providing a second digital error signal representing a difference between said second output measurement and said reference value, said second analog-to-digital converter having greater resolution than said first analog-to-digital converter, said second digital error signal being applied to said first digital control loop to improve accuracy of said first output measurement and thereby improve regulation of said voltage regulator;
wherein said second digital control loop further comprises a variable resistor operatively coupled to said output terminals and responsive to said second digital error signal to adjust said first output measurement.

11. A voltage regulator comprising:
at least one power switch adapted to convey power between respective input and output terminals of said voltage regulator; and
a digital controller adapted to control operation of said at least one power switch responsive to an output of said voltage regulator, said digital controller comprising:
a first digital control loop including a first analog-to-digital converter providing a first digital error signal representing a difference between a first output measurement of said voltage regulator and a reference value, a first digital filter providing a digital control output based on said first digital error signal, and a digital pulse width modulator providing a control signal to said at least one power switch, said control signal having a pulse width corresponding to said digital control output; and
a second digital control loop including a second analog-to-digital converter providing a second output measurement of said voltage regulator, said second digital control loop providing a second digital error signal representing a difference between said second output measurement and said reference value, said second analog-to-digital converter having greater resolution than said first analog-to-digital converter, said second digital error signal being applied to said first digital control loop to improve accuracy of said first output measurement and thereby improve regulation of said voltage regulator;
wherein said second digital control loop adjusts said reference value using said second digital error signal.

12. The voltage regulator of claim 11, wherein said second digital control loop further comprises a phase accumulator that provides dithering of said reference value.

13. A voltage regulator comprising:
at least one power switch adapted to convey power between respective input and output terminals of said voltage regulator; and
a digital controller adapted to control operation of said at least one power switch responsive to an output of said voltage regulator, said digital controller comprising:
a first digital control loop including a first analog-to-digital converter providing a first digital error signal representing a difference between a first output measurement of said voltage regulator and a reference value, a first digital filter providing a digital control output based on said first digital error signal, and a digital pulse width modulator providing a control signal to said at least one power switch, said control signal having a pulse width corresponding to said digital control output; and
a second digital control loop including a second analog-to-digital converter providing a second output measurement of said voltage regulator, said second digital control loop providing a second digital error signal representing a difference between said second output measurement and said reference value, said second analog-to-digital converter having greater resolution than said first analog-to-digital converter, said second digital error signal being applied to said first digital control loop to improve accuracy of said first output measurement and thereby improve regulation of said voltage regulator;
wherein said first analog-to-digital converter is clocked at a substantially higher rate than said second analog-to-digital converter.

14. A method of controlling a voltage regulator comprising at least one power switch adapted to convey power between input and output terminals of said voltage regulator, said method comprising:
receiving first and second output measurements of said voltage regulator;
sampling said first output measurement to provide a first digital error signal representing a difference between said output measurement and a reference value;
filtering said first digital error signal to provide a digital control output;
providing a control signal to said at least one power switch, said control signal having a pulse width corresponding to said digital control output;
sampling said second output measurement to provide a second digital error signal representing a difference between said output measurement and a reference value, and
adjusting said first output measurement using said second digital error signal;
wherein, said first sampling step is performed at substantially higher speed and lower resolution than said second sampling step.

15. The method of claim 14, further comprising receiving reference data defining said reference value.

16. The method of claim 14, further comprising sending monitor data corresponding to said second output measurement.

17. The method of claim 14, further comprising receiving coefficient data and using said coefficient data in performing said filtering step.

18. The method of claim 15, further comprising converting said reference data to said reference value.

19. The method of claim 14, further comprising providing an analog error signal representing said difference between said first output measurement and said reference value.

20. The method of claim 14, further comprising adjusting said reference value using said second digital error signal.

21. The method of claim 14, further comprising dithering said reference value.

* * * * *

UNITED STATES PATENT AND TRADEMARK OFFICE
CERTIFICATE OF CORRECTION

| | |
|---|---|
| PATENT NO. | : 7,141,956 B2 |
| APPLICATION NO. | : 11/084766 |
| DATED | : November 28, 2006 |
| INVENTOR(S) | : Alain Chapuis |

Page 1 of 1

It is certified that error appears in the above-identified patent and that said Letters Patent is hereby corrected as shown below:

Column 8,
Line 23, Claim 7, delete "The voltage regulator of claim 1,".

Signed and Sealed this

Fourteenth Day of August, 2007

JON W. DUDAS
*Director of the United States Patent and Trademark Office*